(12) United States Patent
Hu et al.

(10) Patent No.: US 9,007,543 B2
(45) Date of Patent: Apr. 14, 2015

(54) EDGE-LIT LED BACKLIGHT MODULE, LIQUID CRYSTAL DISPLAY DEVICE AND METHOD FOR FIXING REFLECTION SHEET

(71) Applicant: Shenzhen China Star Optoelectronics Technology Co., Ltd., Guangdong (CN)

(72) Inventors: Che-Chang Hu, Guangdong (CN); Qian Cao, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 147 days.

(21) Appl. No.: 13/703,033

(22) PCT Filed: Oct. 9, 2012

(86) PCT No.: PCT/CN2012/082619
§ 371 (c)(1),
(2) Date: Dec. 10, 2012

(87) PCT Pub. No.: WO2014/040325
PCT Pub. Date: Mar. 20, 2014

(65) Prior Publication Data
US 2014/0111738 A1   Apr. 24, 2014

(30) Foreign Application Priority Data

Sep. 11, 2012 (CN) .......................... 2012 1 0334314

(51) Int. Cl.
*G02F 1/1333* (2006.01)
*F21V 8/00* (2006.01)
*G02F 1/1335* (2006.01)

(52) U.S. Cl.
CPC ........ *G02B 6/0088* (2013.01); *G02F 1/133615* (2013.01); *G02B 6/0001* (2013.01); *G02F 2201/54* (2013.01)

(58) Field of Classification Search
CPC ........................................... G02F 2001/133314
USPC ............................................................. 349/58
See application file for complete search history.

(56) References Cited

U.S. PATENT DOCUMENTS 7,688,398 B2 * 3/2010 Kim ................................ 349/60

* cited by examiner

*Primary Examiner* — James Dudek

(57) ABSTRACT

This invention discloses an edge-lit LED backlight module, a liquid crystal display device and a method for fixing a reflection sheet. This backlight module comprises a backplate, a sidewall connected to the backplate, a light guide plate arranged on the backplate, a light-emitting device arranged on the backplate, and a reflection sheet arranged between the backplate and the light guide plate; wherein the light guide plate has a light-exiting top surface and a light-entering side adjacent to the light-exiting top surface, and the light-emitting device is located between the light-entering side and the sidewall. This backlight module further includes at least a first tension member and a second tension member with their both ends respectively connected to the reflection sheet and the backplate. The backlight module herein can effectively prevent the reflection sheet from warping caused by thermal expansion and further improve the optical quality of the backlight module.

13 Claims, 4 Drawing Sheets

EDGE-LIT LED BACKLIGHT MODULE, LIQUID CRYSTAL DISPLAY DEVICE AND METHOD FOR FIXING REFLECTION SHEET

FIELD OF THE INVENTION

The present invention, belonging to the technical field of liquid crystal display, relates to an edge-lit LED backlight module. More specifically, the present invention relates to an edge-lit LED backlight module that can prevent the reflection sheet from warping in a heated state, a liquid crystal display device using the same, as well as a method for fixing the reflection sheet.

BACKGROUND OF THE INVENTION

Edge-lit LED backlight module has become the mainstream design of the current backlight module because of its advantages such as energy conservation, environmental protection, low power consumption and ultrathin. With maturity of the LED technology, the backlight module design using the high-power less-number LED has further become the irresistible general trend. However, the surface temperature of LED of this design rises up quickly, and therefore higher requirements are put forward for the heat resistance of the related optical members. In the prior art, the reflection sheet of the edge-lit LED backlight module is usually close to the LED, and thus very easy to expand due to the high temperature at the light-entering side of the LED, so that it produces wavy warp in a heated state, which affects the optical quality of the entire edge-lit LED backlight module.

SUMMARY OF THE INVENTION

Aiming at the defect that the reflection sheet produces wavy warp under the influence of high temperature generated by the high power LED which further affect the optical quality of the entire backlight module in the prior art, the technical problem to be solved by the present invention is to provide an edge-lit LED backlight module that can prevent the reflection sheet from warping in a heated state and further improve the optical quality of the backlight module, a liquid crystal display device using the same, as well as a method for fixing the reflection sheet.

The present invention resolves its technical problem through the following technical solutions: an edge-lit LED backlight module, comprising:

a backplate and a sidewall connected to the backplate;

a light guide plate arranged on the backplate and having a light-exiting top surface as well as a light-entering side adjacent to the light-exiting top surface;

a light-emitting device arranged on the backplate and located between the light-entering side and the sidewall; and a reflection sheet arranged between the backplate and the light guide plate;

wherein the backlight module further includes at least a first tension member and a second tension member, with both ends of the first tension member and the second tension member respectively connected to the reflection sheet and the backplate.

In the above-mentioned edge-lit LED backlight module, the first tension member and the second tension member are arranged symmetrically with respect to a center of the reflection sheet.

In the above-mentioned edge-lit LED backlight module, the first tension member and second tension member are arranged symmetrically with respect to a symmetric axis of the reflection sheet.

In the above-mentioned edge-lit LED backlight module, the backlight module further includes at least a third tension member and a fourth tension member, with both ends of the third tension member and the fourth tension member respectively connected to the reflection sheet and the backplate.

In the above-mentioned edge-lit LED backlight module, both the backplate and the reflection sheet are square in shape, wherein a side length of the backplate is larger than that of the reflection sheet, and the backplate and the reflection sheet are arranged concentrically; wherein both ends of the first tension member, the second tension member, the third tension member and the fourth tension member are respectively connected to four corners of the reflection sheet and the backplate.

In the above-mentioned edge-lit LED backlight module, the first tension member, the second tension member, the third tension member and the fourth tension member are made of elastic material.

In the above-mentioned edge-lit LED backlight module, the first tension member, the second tension member, the third tension member and the fourth tension member are springs or rubber bands.

In the above-mentioned edge-lit LED backlight module, the first tension member, the second tension member, the third tension member and the fourth tension member are detachably connected to the backplate and the reflection sheet.

According to another aspect of the present invention, a liquid crystal display device comprising a liquid crystal display panel is provided, wherein its characteristics lie in that the liquid crystal display device further includes the above-mentioned edge-lit LED backlight module.

According to another aspect of the present invention, a method is provided for fixing a reflection sheet in an edge-lit LED backlight module, the method including: applying to the reflection sheet at least a first pulling force and a second pulling force to make the reflection sheet be in a tensile state in a heated state.

When implementing the present invention, the following advantageous effects can be achieved: in the present invention, the reflection sheet is fixed through the first tension member and the second tension member, both ends of which are respectively connected to the reflection sheet and the backplate, and thereby at least two pulling forces can be applied to the reflection sheet; the above-mentioned pulling forces can make the reflection sheet still remain in a tensile state when it is heated and has a certain degree of thermal expansion, thus effectively preventing the reflection sheet from warping caused by thermal expansion, and further improving the optical quality of the backlight module. The liquid crystal display device of the present invention adopts the above-mentioned edge-lit LED backlight module that can prevent the reflection sheet from thermally warping, and thus has better display effects.

BRIEF DESCRIPTION OF THE DRAWINGS

The present invention will further be described below in detail with reference to appended drawings and specific embodiments. In the drawings:

FIG. 1b is an enlarged schematic diagram of A in FIG. 1a;

DETAILED DESCRIPTION OF THE PREFERRED EMBODIMENT

The present invention will further be described below in detail with reference to appended drawings and specific embodiments. It should be understood that the specific embodiments are used only for explaining the present invention rather than for limiting the present invention.

The present invention has the following definitions of orientation: the direction in which light is emitted from the edge-lit LED backlight module (hereinafter referred to as the backlight module for short) refers to the front, while its opposite direction refers to the rear; in other words, the orientation where the liquid crystal display panel of the liquid crystal display device is located refers to the front, and the orientation where the backlight module is located refers to the rear.

The present invention provides an edge-lit LED backlight module, which includes a tension member applying at least two pulling forces to the reflection sheet, thus making the reflection sheet be in a tensile state in a heated state and preventing the reflection sheet from warping caused by thermal expansion in the prior art. The specific description is as follows.

Embodiment 1

Figure 1A:
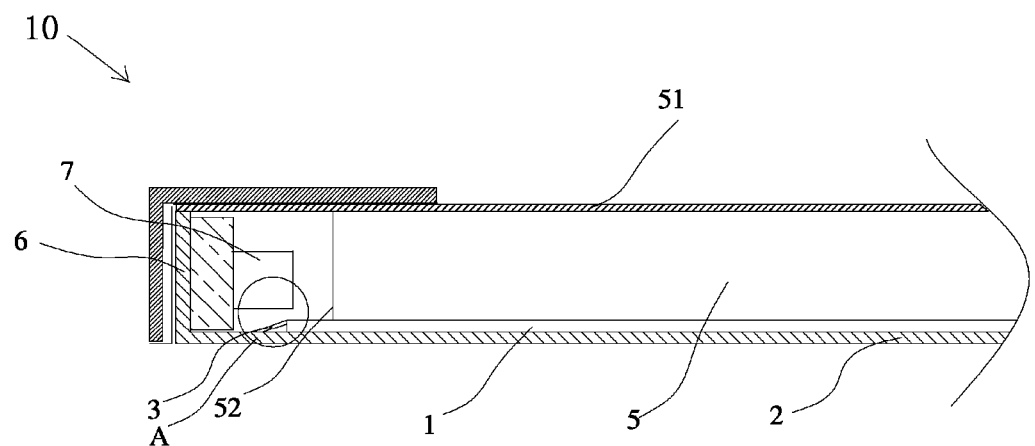
FIG. 1a is a schematic diagram of the edge-lit LED backlight module according to Embodiment 1 of the present invention.
Figure 2A:
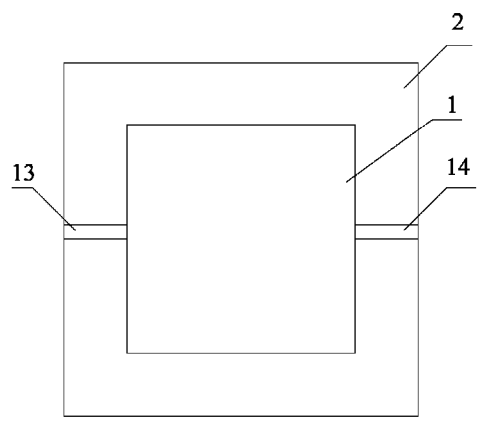
FIG. 2a is a schematic diagram illustrating the connection relation between the first tension member and the second tension member and the reflection sheet and the backplate in the edge-lit LED backlight module according to Embodiment 1 of the present invention.

See FIGS. 1a and 2a-2c for reference. FIG. 1a is a schematic diagram of the edge-lit LED backlight module 10 according to Embodiment 1 of the present invention. This backlight module 10 includes a backplate 2, a sidewall 6 connected to the backplate 2, a light guide plate 5 and a light-emitting device 7 arranged on the backplate 2, and a reflection sheet 1 arranged between the backplate 2 and the light guide plate 5. The light guide plate 5 of the present invention has a light-exiting top surface 51 and a light-entering side 52 adjacent to the light-exiting top surface 51, and the light-emitting device 7 is located between the light-entering side 51 and the sidewall 6. This backlight module 10 further includes a first tension member 13 and a second tension member 14 with their both ends respectively connected to the reflection sheet 1 and the backplate 2. Specifically, both the reflection sheet 1 and the backplate 2 are square in shape and arranged concentrically; wherein the side length of the backplate 2 is larger than that of the reflection sheet 1, and the reflection sheet 1 is arranged on the backplate 2. In Embodiment 1, both the first tension member 13 and the second tension member 14 are a spring. It can be seen clearly from FIG. 2a that the first tension member 13 and the second tension member 14 are arranged by bilateral symmetry at the orientation as shown in FIG. 2a (i.e. arranged symmetrically with respect to the vertical symmetric axis at the orientation as shown in the figure), and preferably arranged at the middle of left and right sides of the reflection sheet 1 and the backplate 2 respectively.

Figures 2B, 2C:
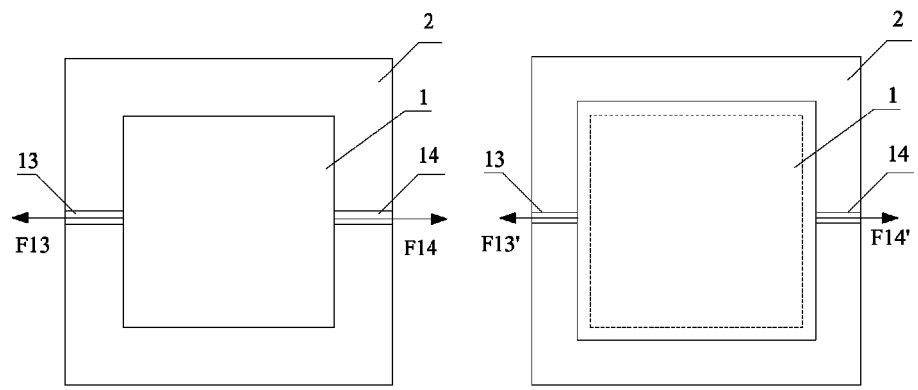
FIG. 2b is a schematic diagram illustrating applying a pulling force to the reflection sheet at room temperature according to Embodiment 1 of the present invention.
FIG. 2c is a schematic diagram illustrating applying a pulling force to the reflection sheet in a heated state according to Embodiment 1 of the present invention.

In the connection relation as shown in FIG. 2a, the first tension member 13 and the second tension member 14 make the reflection sheet 1 remain in a tensile state at room temperature. As shown in FIG. 2b, F13 and F14 respectively represent the pulling force applied to the reflection sheet 1 by the first tension member 13 and the second tension member 14, with the arrowhead further indicating the direction of the pulling force. Preferably, both of them are a spring with the same elastic coefficient, and the same magnitude of pulling force is applied to the reflection sheet 1 at room temperature. In a heated state, the reflection sheet 1 has a certain degree of expansion because of the high temperature. As shown in FIG. 2c, the dotted-line box represents the size of the reflection sheet 1 at normal temperatures, and the solid-line box closest to the dotted-line box represents the size of the reflection sheet 1 in a heated state (after expansion). Here, although the spring has reduced deformation because the size of the reflection sheet 1 becomes bigger, it is still in a tensile deformation state, i.e. in a heated state the first tension member 13 and the second tension member 14 still apply a pulling force to the reflection sheet 1 (in FIG. 2c, F13' and F14' respectively represent a first pulling force and a second pulling force, of which the directions are indicated by the arrowhead). Although the pulling force applied to the reflection sheet 1 is reduced, the reflection sheet 1 herein is still in a tensile state under the action of the first pulling force F13' and the second pulling force F14', thus avoiding the warping caused by thermal expansion. Likewise, the first pulling force F13' and the second pulling force F14' are preferably identical in magnitude and opposite in direction so as to act upon on the reflection sheet 1 evenly and further improve the optical quality of the backlight module.

In Embodiment 1 as shown in FIGS. 2a-2c, although the two tension members are arranged symmetrically with respect to the reflection sheet, they may, in other examples, be connected to the reflection sheet in any other ways. For example, but not limited to, the two tension members are connected to the same side of the reflection sheet, the two tension members are connected to the adjacent side of the reflection sheet, the two tension members are respectively connected to the two corners of the reflection sheet and the like. Besides, it is needed to explain that the tension member of the present invention can also be connected to the backplate and the reflection sheet in any suitable ways. For example, but not limited to, the backplate and the reflection sheet are respectively provided with a through hole, and then the tension member can pass through the through hole. The present invention is not limited to the above-mentioned specific connection mode of the members. However, the tension member of the present invention is preferably detachably connected to the reflection sheet and the backplate, so that the tension member can be replaced when the backlight module is used many times and the pulling force of the tension member has an unobvious function, thus further improving practicality and convenience of the present invention.

Embodiment 2

Figure 3A:
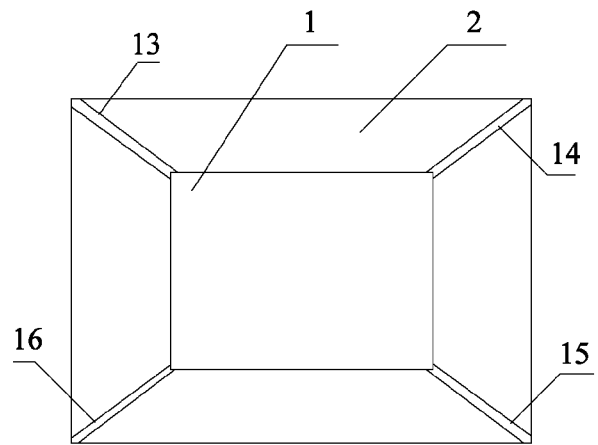
FIG. 3a is a schematic diagram illustrating the connection relation between the first tension member, the second tension member, the third tension member and the fourth tension member and the reflection sheet and the backplate in the edge-lit LED backlight module according to Embodiment 2 of the present invention.
Figure 3B:
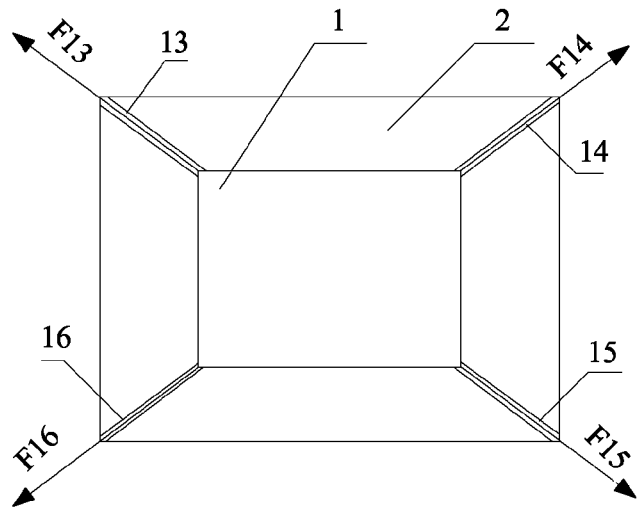
FIG. 3b is a schematic diagram illustrating applying a pulling force to the reflection sheet at room temperature according to Embodiment 2 of the present invention.
Figure 3C:
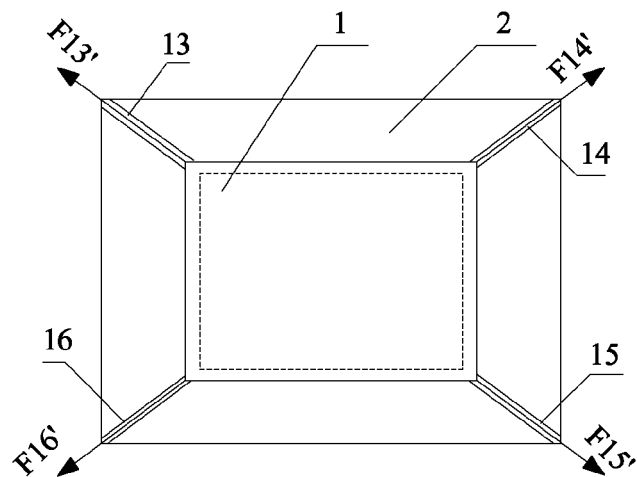
FIG. 3c is a schematic diagram illustrating applying a pulling force to the reflection sheet in a heated state according to Embodiment 2 of the present invention.

See FIGS. 3a-3c for reference. FIG. 3a is a schematic diagram illustrating the connection relation between the first tension member, the second tension member, the third tension member and the fourth tension member and the reflection sheet and the backplate according to Embodiment 2 of the present invention. Herein, the backlight module is not shown completely, but only the connection relation of the above-mentioned three members is shown. As shown in FIG. 3a, this backlight module includes a reflection sheet 1, a backplate 2 as well as a first tension member 13, a second tension member 14, a third tension member 15 and a fourth tension member 16 with their both ends respectively connected to the reflection sheet 1 and the backplate 2. Specifically, both the reflection sheet 1 and the backplate 2 are square in shape and arranged concentrically; wherein both length and width of the backplate 2 are larger than those of the reflection sheet 1, and the reflection sheet 1 is arranged on the backplate 2. In Embodiment 2, all the four tension members 13, 14, 15 and 16 are rubber bands. The four tension members 13, 14, 15 and 16 are respectively connected to the four corners of the reflection sheet 1 and the backplate 2, wherein the first tension member 13 is in central symmetry with the third tension member 15, and the second tension member 14 is in central symmetry with respect to the fourth tension member 16.

In the backlight module as shown in FIG. 3a, the first tension member 13, the second tension member 14, the third tension member 15 and the fourth tension member 16 make the reflection sheet 1 remain in a tensile state at room temperature. As shown in FIG. 3b, F13, F14, F15 and F16 represent the pulling forces applied to the reflection sheet 1 respectively by the first tension member 13, the second tension member 14, the third tension member 15 and the fourth tension member 16, with the arrowhead further indicating the direction of the pulling force. Because the reflection sheet 1 and the backplate 2 are concentrically arranged, all the components of the pulling force applied by the four tension members in the plane where the reflection sheet 1 is located are in the diagonal direction of the reflection sheet 1. Preferably, the four tension members 13, 14, 15 and 16 are rubber bands with the same elastic coefficient, and the same magnitude of pulling force is applied to the reflection sheet 1 at room temperature.

In a heated state, the reflection sheet 1 will have a certain degree of expansion under the action of high temperature. As shown in FIG. 3c, the dotted-line box represents the size of the reflection sheet 1 at room temperature, and the solid-line box closest to the dotted-line box represents the size of the reflection sheet 1 in a heated state (after expansion). Here, although the rubber band has reduced deformation because the size of the reflection sheet 1 becomes bigger, it is still in a tensile deformation state; that is, in a heated state, the first tension member 13, the second tension member 14, the third tension member 15 and the fourth tension member 16 still apply the pulling force to the reflection sheet 1 (F13', F14', F15' and F16' in FIG. 3c respectively represent the first pulling force, the second pulling force, the third pulling force and the fourth pulling force applied by the four tension members 13, 14, 15 and 16, with the arrowhead further indicating the direction of the respective pulling force). Although the pulling force applied to the reflection sheet 1 is reduced, here the reflection sheet 1 is still in a tensile state under the action of the four pulling forces, thus preventing the reflection sheet 1 from warping caused by thermal expansion. Likewise, it is preferable that the first pulling force F13' and the third pulling force F15' are identical in magnitude and opposite in direction, and the second pulling force F14' and the fourth pulling force F16' are identical in magnitude and opposite in direction, in which case they evenly act upon on the reflection sheet 1 so as to further improve the optical quality of the backlight module.

Embodiment 3

Figure 4:
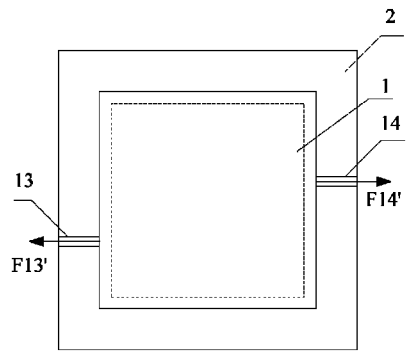
FIG. 4 is a schematic diagram illustrating the connection relation between the first tension member and the second tension member and the reflection sheet and the backplate in the edge-lit LED backlight module according to Embodiment 3 of the present invention.
Figure 5:
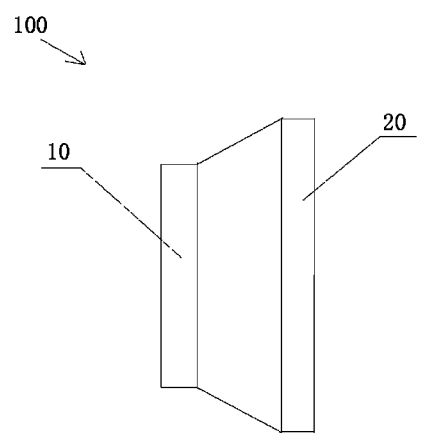
FIG. 5 is a schematic diagram of the liquid crystal display device according to the present invention.

FIG. 4 is a schematic diagram illustrating the connection relation between the first tension member and second tension member and the reflection sheet and the backplate according to Embodiment 3 of the present invention. The difference between this embodiment and Embodiment 1 only lies in that the two tension members are arranged at different positions, and therefore the complete illustration of the backlight module is omitted here. As shown in FIG. 4, this backlight module includes a first tension member 13 and a second tension member 14 with their both ends respectively connected to a reflection sheet 1 and a backplate 2. Specifically, both the reflection sheet 1 and the backplate 2 are square in shape and arranged concentrically; wherein the side length of the backplate 2 is larger than that of the reflection sheet 1, and the reflection sheet 1 is arranged on the backplate 2. In Embodiment 3, both the first tension member 13 and the second tension member 14 are a spring. It can be seen clearly from the figure that the first tension member 13 and the second tension member 14 are arranged symmetrically with respect to the center of the reflection sheet 1 at the orientation as shown in FIG. 4.

Figure 1B:
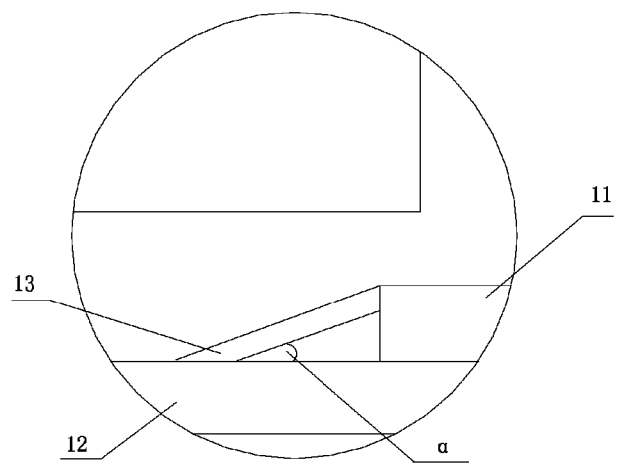

In each embodiment of the present invention, the angle formed between each tension member and the plane where the reflection sheet is located (also the plane where the backplate is located) is not larger than 45°. In this way, the angle thus formed between the action direction of each of the pulling forces applied to the reflection sheet by each tension member and the plane where the reflection sheet is located is not larger than 45° either. Especially, the angle formed between each tension member and the plane where the reflection sheet is located is preferable to be 0°, i.e. the action direction of each of the pulling forces applied to the reflection sheet is in the plane where the reflection sheet is located. In Embodiment 1 of the present invention, as shown in FIG. 1b, the angle α formed between the first tension member 13 and the plane where the backplate 2 is located is 19°.

In addition, the present invention further provides a liquid crystal display device 100, which includes a liquid crystal display panel 20 and a backlight module 10 located at the rear of this liquid crystal display panel 20. Since the backlight module 10 having the above-mentioned tension member can effectively prevent the reflection sheet from warping during thermal expansion, it can be guaranteed to provide good lighting effect for the liquid crystal display panel 20, thus finally improving the display effect of the liquid crystal display device 100.

In summary, in the present invention, at least two pulling forces can be applied to the reflection sheet through the first tension member and the second tension member with their both ends respectively connected to the reflection sheet and the backplate, and the reflection sheet is still kept in a tensile state when it is in a heated state and has a certain degree of thermal expansion, thus effectively preventing the reflection sheet from warping caused by thermal expansion, and further improving the optical quality of the backlight module. The liquid crystal display device of the present invention adopts the above-mentioned edge-lit LED backlight module that can prevent the reflection sheet from thermally warping, and thus has better display effect.

The invention claimed is:

1. An edge-lit LED backlight module, comprising:
a backplate and a sidewall connected to the backplate;
a light guide plate arranged on the backplate and having a light-exiting top surface as well as a light-entering side adjacent to the light-exiting top surface;
a light-emitting device arranged on the backplate and located between the light-entering side and the sidewall; and
a reflection sheet arranged between the backplate and the light guide plate;
wherein the backlight module further includes at least a first tension member and a second tension member, with both ends of the first tension member and the second tension member respectively connected to the reflection sheet and the backplate;
wherein the backlight module further includes at least a third tension member and a fourth tension member, with both ends of the third tension member and the fourth tension member respectively connected to the reflection sheet and the backplate;
wherein both the backplate and the reflection sheet are square in shape; wherein a side length of the backplate is larger than that of the reflection sheet, and the backplate and the reflection sheet are arranged concentrically; wherein both ends of the first tension member, the second tension member, the third tension member and the fourth tension member are respectively connected to four corners of the reflection sheet and the backplate.

2. The edge-lit LED backlight module according to claim 1, wherein the first tension member and the second tension member are arranged symmetrically with respect to a center of the reflection sheet.

3. The edge-lit LED backlight module according to claim 1, wherein the first tension member and the second tension member are arranged symmetrically with respect to a symmetric axis of the reflection sheet.

4. The edge-lit LED backlight module according to claim 1, wherein the first tension member, the second tension member, the third tension member and the fourth tension member are made of elastic material.

5. The edge-lit LED backlight module according to claim 1, wherein the first tension member, the second tension member, the third tension member and the fourth tension member are springs or rubber bands.

6. The edge-lit LED backlight module according to claim 1, wherein the first tension member, the second tension member, the third tension member and the fourth tension member are detachably connected to the backplate and reflection sheet.

7. A liquid crystal display device, comprising a liquid crystal display panel, wherein the liquid crystal display device farther includes an edge-lit LED backlight module, which comprises:
a backplate and a sidewall connected to the backplate;
a light guide plate arranged on the backplate and having a light-exiting top surface as well as a light-entering side adjacent to the light-exiting top surface;
a light-emitting device arranged on the backplate and located between the light-entering side and the sidewall; and
a reflection sheet arranged between the backplate and the light guide plate;
wherein the backlight module further includes at least a first tension member and a second tension member, with both ends of the first tension member and the second tension member respectively connected to the reflection sheet and the backplate;
wherein the backlight module further includes at least a third tension member and a fourth tension member, with both ends of the third tension member and the fourth tension member respectively connected to the reflection sheet and the backplate;
wherein both the backplate and the reflection sheet are square in shape; wherein a side length of the backplate is larger than that of the reflection sheet, and the backplate and the reflection sheet are arranged concentrically; wherein both ends of the first tension member, the second tension member, the third tension member and the fourth tension member are respectively connected to four corners of the reflection sheet and the backplate.

8. The liquid crystal display device of claim 7, wherein the first tension member and the second tension member are arranged symmetrically with respect to a center of the reflection sheet.

9. The liquid crystal display device of claim 7, wherein the first tension member and the second tension member are arranged symmetrically with respect to a symmetric axis of the reflection sheet.

10. The liquid crystal display device of claim 7, wherein the first tension member, the second tension member, the third tension member and the fourth tension member are made of elastic material.

11. The liquid crystal display device of claim 7, wherein the first tension member, the second tension member, the third tension member and the fourth tension member are springs or rubber bands.

12. The liquid crystal display device of claim 7, wherein the first tension member, the second tension member, the third tension member and the fourth tension member are detachably connected to the backplate and reflection sheet.

13. A method for fixing a reflection sheet in an edge-lit LED backlight module, wherein the method comprises applying to the reflection sheet at least a first pulling force and a second pulling force to make the reflection sheet be in a tensile state in a heated state.

* * * * *